(12) United States Patent
Takaiwa

(10) Patent No.: US 8,175,447 B2
(45) Date of Patent: May 8, 2012

(54) IMAGE PICKUP APPARATUS AND CONTROL METHOD THEREFOR

(75) Inventor: Kan Takaiwa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 12/834,522

(22) Filed: Jul. 12, 2010

(65) Prior Publication Data

US 2011/0013894 A1    Jan. 20, 2011

(30) Foreign Application Priority Data

Jul. 16, 2009    (JP) ................. 2009-167679

(51) Int. Cl.
*G03B 17/00*    (2006.01)
*G03B 7/099*    (2006.01)
*G03B 7/085*    (2006.01)

(52) U.S. Cl. .................... 396/48; 396/111; 396/257

(58) Field of Classification Search .......... 396/48, 396/111, 121, 128; 348/345, 349, 350
See application file for complete search history.

(56) References Cited

U.S. PATENT DOCUMENTS

| | | | |
|---|---|---|---|
| 6,597,868 B2 | 7/2003 | Suda | |
| 6,829,008 B1 | 12/2004 | Kondo et al. | |
| 7,095,441 B2 | 8/2006 | Nagano | |
| 2010/0110272 A1* | 5/2010 | Sugawara | 348/341 |

FOREIGN PATENT DOCUMENTS

| | | |
|---|---|---|
| JP | 2000-156823 | 6/2000 |
| JP | 2000-292686 | 10/2000 |
| JP | 2001-305415 | 10/2001 |
| JP | 2003-153291 | 5/2003 |

* cited by examiner

*Primary Examiner* — W. B. Perkey
*Assistant Examiner* — Minh Phan
(74) *Attorney, Agent, or Firm* — Cowan, Liebowitz & Latman, P.C.

(57) ABSTRACT

The image pickup apparatus includes an image pickup element including first pixels for photoelectrically converting an object image formed by a light flux from an image taking optical system and second pixels for photoelectrically converting optical images formed by light fluxes divided form the light flux from the image taking optical system, and a controller performing focus detection based on a phase difference of the optical images, control of an aperture stop included in the image taking optical system and an image capturing operation for generating a captured image by using signals obtained from the first pixels. The controller increases, when an image capturing aperture size of the aperture stop is smaller than a focus detecting aperture size in a case of performing the focus detection between the image capturing operations in continuous image capturing, the aperture size to the focus detecting aperture size in the focus detection.

8 Claims, 12 Drawing Sheets

FIG. 6

(a) IMAGE CAPTURING STOP APERTURE f0 ≥ MINIMUM FOCUS DETECTING STOP APERTURE f1

| | | | | | | | | |
|---|---|---|---|---|---|---|---|---|
| APERTURE STOP OPERATION | SET TO f0 | f0 | | | | | | |
| IMAGE PICKUP ELEMENT OPERATION | | IMAGE CAPTURING CHARGE ACCUMULATION | READ OUT | FOCUS DETECTING CHARGE ACCUMULATION | READ OUT | IMAGE CAPTURING CHARGE ACCUMULATION | READ OUT | |
| SIGNAL PROCESSING | | | | IMAGE SIGNAL PROCESSING | PHASE DIFFERENCE PROCESSING | | | IMAGE SIGNAL PROCESSING |
| FOCUS DRIVING | | | | | | DRIVE | | |

(b) IMAGE CAPTURING STOP APERTURE f0 < MINIMUM FOCUS DETECTING STOP APERTURE f1

| | | | | | | | | | |
|---|---|---|---|---|---|---|---|---|---|
| SHUTTER BUTTON | OFF | ON | | | | | | | OFF |
| APERTURE STOP OPERATION | | SET TO f0 | f0 | SET TO f1 | f1 | SET TO f0 | f0 | | |
| IMAGE PICKUP ELEMENT OPERATION | | | IMAGE CAPTURING CHARGE ACCUMULATION | | FOCUS DETECTING CHARGE ACCUMULATION | READ OUT | IMAGE CAPTURING CHARGE ACCUMULATION | READ OUT | |
| SIGNAL PROCESSING | | | | | | IMAGE SIGNAL PROCESSING | PHASE DIFFERENCE PROCESSING | | IMAGE SIGNAL PROCESSING |
| FOCUS DRIVING | | | | | | | | DRIVE | |

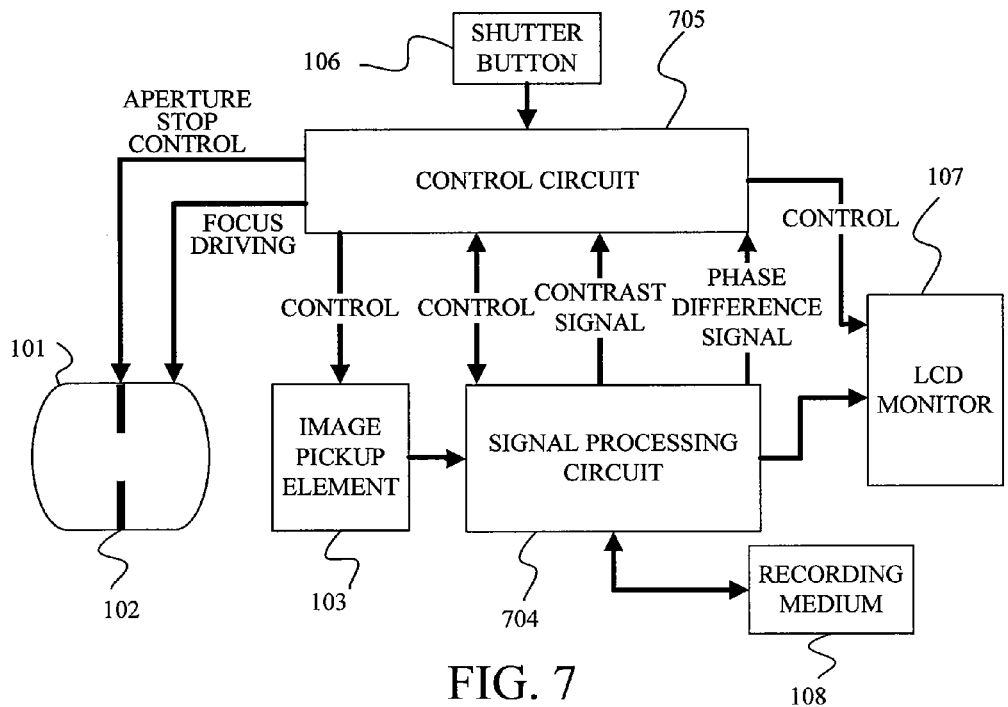

FIG. 7

| | m-4 | m-3 | m-2 | m-1 | m | m+1 | m+2 | m+3 | m+4 |
|---|---|---|---|---|---|---|---|---|---|
| k-4 | a(m-4,k-4) | a(m-3,k-4) | a(m-2,k-4) | a(m-1,k-4) | a(m,k-4) | a(m+1,k-4) | a(m+2,k-4) | a(m+3,k-4) | a(m+4,k-4) |
| k-3 | a(m-4,k-3) | a(m-3,k-3) | a(m-2,k-3) | a(m-1,k-3) | a(m,k-3) | a(m+1,k-3) | a(m+2,k-3) | a(m+3,k-3) | a(m+4,k-3) |
| k-2 | a(m-4,k-2) | a(m-3,k-2) | a(m-2,k-2) | a(m-1,k-2) | a(m,k-2) | a(m+1,k-2) | a(m+2,k-2) | a(m+3,k-2) | a(m+4,k-2) |
| k-1 | a(m-4,k-1) | a(m-3,k-1) | a(m-2,k-1) | a(m-1,k-1) | a(m,k-1) | a(m+1,k-1) | a(m+2,k-1) | a(m+3,k-1) | a(m+4,k-1) |
| k | a(m-4,k) | a(m-3,k) | a(m-2,k) | a(m-1,k) | a(m,k) | a(m+1,k) | a(m+2,k) | a(m+3,k) | a(m+4,k) |
| k+1 | a(m-4,k+1) | a(m-3,k+1) | a(m-2,k+1) | a(m-1,k+1) | a(m,k+1) | a(m+1,k+1) | a(m+2,k+1) | a(m+3,k+1) | a(m+4,k+1) |
| k+2 | a(m-4,k+2) | a(m-3,k+2) | a(m-2,k+2) | a(m-1,k+2) | a(m,k+2) | a(m+1,k+2) | a(m+2,k+2) | a(m+3,k+2) | a(m+4,k+2) |
| k+3 | a(m-4,k+3) | a(m-3,k+3) | a(m-2,k+3) | a(m-1,k+3) | a(m,k+3) | a(m+1,k+3) | a(m+2,k+3) | a(m+3,k+3) | a(m+4,k+3) |
| k+4 | a(m-4,k+4) | a(m-3,k+4) | a(m-2,k+4) | a(m-1,k+4) | a(m,k+4) | a(m+1,k+4) | a(m+2,k+4) | a(m+3,k+4) | a(m+4,k+4) |

FIG. 8

| SHUTTER BUTTON | OFF | ON | | | | | | |
|---|---|---|---|---|---|---|---|---|
| APERTURE STOP OPERATION | | SET TO f0 | f0 | SET TO f1 | f1 | SET TO f0 | f0 | OFF |
| IMAGE PICKUP ELEMENT OPERATION | | | IMAGE CAPTURING CHARGE ACCUMULATION | READ OUT | FOCUS DETECTING CHARGE ACCUMULATION | READ OUT | IMAGE CAPTURING CHARGE ACCUMULATION | READ OUT |
| SIGNAL PROCESSING | | | | | IMAGE SIGNAL PROCESSING | PHASE DIFFERENCE PROCESSING | | IMAGE SIGNAL PROCESSING |
| FOCUS DRIVING | | | | | | | DRIVE | |

(a) SEQUENCE IN HIGH-SPEED CONTINUOUS IMAGE CAPTURING MODE

| SHUTTER BUTTON | OFF | ON | | | | | | |
|---|---|---|---|---|---|---|---|---|
| APERTURE STOP OPERATION | | SET TO f0 | f0 | | | | | OFF |
| IMAGE PICKUP ELEMENT OPERATION | | | IMAGE CAPTURING CHARGE ACCUMULATION | READ OUT | IMAGE CAPTURING CHARGE ACCUMULATION | READ OUT | IMAGE CAPTURING CHARGE ACCUMULATION | READ OUT |
| SIGNAL PROCESSING | | | | | SIGNAL PROCESSING | | SIGNAL PROCESSING | SIGNAL PROCESSING |
| FOCUS DRIVING | | | | | DRIVE | | DRIVE | DRIVE |

(b) SEQUENCE IN LOW-SPEED CONTINUOUS IMAGE CAPTURING MODE

FIG. 10

| AREA11 | AREA12 | AREA13 | AREA14 | AREA15 | AREA16 |
| --- | --- | --- | --- | --- | --- |
| AREA21 | AREA22 | AREA23 | AREA24 | AREA25 | AREA26 |
| AREA31 | AREA32 | AREA33 | AREA34 | AREA35 | AREA36 |
| AREA41 | AREA42 | AREA43 | AREA44 | AREA45 | AREA46 |

IMAGE PICKUP APPARATUS AND CONTROL METHOD THEREFOR

BACKGROUND OF THE INVENTION

1. Field of the Invention

The present invention relates to an image pickup apparatus such as a digital camera or a video camera, and more particularly to an image pickup apparatus which performs focus detection by using signals from pixels in an image pickup element.

2. Description of the Related Art

Japanese Patent Laid-Open Nos. 2000-156823 and 2000-292686 disclose image pickup apparatuses each of which includes partial pixels having different optical characteristics from those of other pixels in entire pixels constituting an image pickup element used in the image pickup apparatus, and performs focus detection based on outputs from the partial pixels. In more detail, each of these image pickup apparatuses includes plural pairs of focus detection pixels among plural image pickup pixels on the image pickup element, and performs focus detection of a phase difference detection method (hereinafter referred to as "phase difference detection method focus detection") by using signals from the pairs of the focus detection pixels. Then, the apparatus calculates an in-focus position (or a driving amount) of a focus lens based on a focus detection result, and moves the focus lens according to a calculation result to perform focusing.

Japanese Patent Laid-Open No. 2001-305415 discloses an image pickup apparatus which vertically divides a light receiving portion of each of partial pixels in an image pickup element into two, and performs phase difference detection method focus detection for an object having a vertical luminance distribution by using signals from the two-divided light receiving portions. This image pickup apparatus further detects contrast of an object having a horizontal luminance distribution by pixels horizontally adjacent to each other to perform focus detection of a contrast detection method (hereinafter referred to as "contrast detection method focus detection").

Japanese Patent Laid-Open No. 2003-153291 discloses an image pickup apparatus in which focus detection pixels having light receiving portions each being divided horizontally or vertically are repeatedly disposed every other line in an image pickup element, and which performs phase difference detection method focus detection for an object having a horizontal luminance distribution or a vertical luminance distribution.

However, in the image pickup apparatuses disclosed in Japanese Patent Laid-Open Nos. 2000-156823, 2000-292686, 2001-305415 and 2003-153291, a small aperture size of an aperture stop provided in an image taking optical system (the aperture size corresponds to an exit pupil diameter of the image taking optical system) makes an amount of light reaching the focus detection pixels insufficient. In consequence, the image pickup apparatus cannot perform good phase difference detection method focus detection.

In particular, in a case of performing the phase difference detection method focus detection between plural image capturing operations each being performed for capturing one frame image in continuous image capturing, when an aperture size of the aperture stop set for image capturing is smaller than that corresponding to a light amount necessary for the phase difference detection method focus detection, the image pickup apparatus cannot perform good focus detection between the image capturing operations.

SUMMARY OF THE INVENTION

The present invention provides an image pickup apparatus capable of performing good focus detection in continuous image capturing even when an aperture size of an aperture stop set for image capturing is small.

The present invention provides as one aspect thereof an image pickup apparatus including an image pickup element configured to include first pixels for photoelectrically converting an object image formed by a light flux from an image taking optical system and second pixels for photoelectrically converting optical images formed by light fluxes divided from the light flux from the image taking optical system, and a controller configured to perform focus detection based on a phase difference of the optical images, the phase difference being detected by using signals obtained by photoelectric conversion performed by the second pixels, control of an aperture stop included in the image taking optical system, and an image capturing operation for generating a captured image by using signals obtained by photoelectric conversion performed by the first pixels. The controller is configured to increase, when an aperture size of the aperture stop set for the image capturing operation is smaller than a focus detecting aperture size corresponding to a light amount necessary for the focus detection in a case of performing the focus detection between the image capturing operations in continuous image capturing, the aperture size to the focus detecting aperture size in the focus detection.

The present invention provides as another aspect thereof an image pickup apparatus including an image pickup element configured to include first pixels for photoelectrically converting an object image formed by a light flux from an image taking optical system and second pixels for photoelectrically converting optical images formed by light fluxes divided from the light flux from the image taking optical system, and a controller configured to perform phase difference detection method focus detection based on a phase difference of the optical images, the phase difference being detected by using signals obtained by photoelectric conversion performed by the second pixels, contrast detection method focus detection based on contrast information detected by using signals obtained by photoelectric conversion performed by the first pixels, control of an aperture stop included in the image taking optical system, and an image capturing operation for generating a captured image by using the signals obtained by the photoelectric conversion performed by the first pixels. The image pickup apparatus has a first continuous image capturing mode in which the phase difference detection method focus detection is performed between the image capturing operations and a second continuous image capturing mode in which a time period between the image capturing operations is shorter than that in the first continuous image capturing mode. The controller is configured to increase in the first continuous image capturing mode, when an aperture size of the aperture stop set for the image capturing operation is smaller than a focus detecting aperture size corresponding to a light amount necessary for the phase difference detection method focus detection, the aperture size to the focus detecting aperture size in the phase difference detection method focus detection. The controller is configured to perform in the second continuous image capturing mode, when the aperture size set for the image capturing operation is larger than the focus detecting aperture size, the phase difference detection method focus detection for a subsequent image capturing operation by using the signals obtained by the photoelectric conversion performed by the second pixels in a precedent image capturing operation. The controller is configured to perform in the second continuous image capturing mode, when the aperture size set for the image capturing operation is smaller than the focus detecting aperture size, the contrast detection method focus detection for the subsequent image capturing operation by using the signals obtained by the photoelectric conversion performed by the first pixels in the precedent image capturing operation.

The present invention provides as still another aspect thereof a method for controlling an image pickup apparatus including an image pickup element configured to include first pixels for photoelectrically converting an object image formed by a light flux from an image taking optical system and second pixels for photoelectrically converting optical images formed by light fluxes divided from the light flux from the image taking optical system. The method including a step of performing focus detection based on a phase difference of the optical images, the phase difference being detected by using signals obtained by photoelectric conversion performed by the second pixels, a step of performing control of an aperture stop included in the image taking optical system, a step of performing an image capturing operation for generating a captured image by using signals obtained by photoelectric conversion performed by the first pixels, and a step of increasing, when an aperture size of the aperture stop set for the image capturing operation is smaller than a focus detecting aperture size corresponding to a light amount necessary for the focus detection in a case of performing the focus detection between the image capturing operations in continuous image capturing, the aperture size to the focus detecting aperture size in the focus detection.

The present invention provides as yet still another aspect thereof a method for controlling an image pickup apparatus including an image pickup element configured to include first pixels for photoelectrically converting an object image formed by a light flux from an image taking optical system and second pixels for photoelectrically converting optical images formed by light fluxes divided from the light flux from the image taking optical system. The method including a step of performing phase difference detection method focus detection based on a phase difference of the optical images, the phase difference being detected by using signals obtained by photoelectric conversion performed by the second pixels, a step of performing contrast detection method focus detection based on contrast information detected by using signals obtained by photoelectric conversion performed by the first pixels, a step of performing control of an aperture stop included in the image taking optical system, and a step of performing an image capturing operation for generating a captured image by using the signals obtained by the photoelectric conversion performed by the first pixels. The image pickup apparatus has a first continuous image capturing mode in which the phase difference detection method focus detection is performed between the image capturing operations and a second continuous image capturing mode in which a time period between the image capturing operations is shorter than that in the first continuous image capturing mode. The method further including a step of increasing in the first continuous image capturing mode, when an aperture size of the aperture stop set for the image capturing operation is smaller than a focus detecting aperture size corresponding to a light amount necessary for the phase difference detection method focus detection, the aperture size to the focus detecting aperture size in the phase difference detection method focus detection, a step of performing in the second continuous image capturing mode, when the aperture size set for the image capturing operation is larger than the focus detecting aperture size, the phase difference detection method focus detection for a subsequent image capturing operation by using the signals obtained by the photoelectric conversion performed by the second pixels in a precedent image capturing operation, and a step of performing in the second continuous image capturing mode, when the aperture size set for the image capturing operation is smaller than the focus detecting aperture size, the contrast detection method focus detection for the subsequent image capturing operation by using the signals obtained by the photoelectric conversion performed by the first pixels in the precedent image capturing operation.

Other aspects of the present invention will become apparent from the following description and the attached drawings.

BRIEF DESCRIPTION OF THE DRAWINGS

FIG. 6 is a timing chart showing a continuous image capturing sequence in Embodiment 1.

FIG. 7 is a block diagram showing a configuration of an image pickup apparatus which is Embodiment 2 of the present invention.

FIG. 8 shows a pixel arrangement in the vicinity of an attention pixel in a captured image obtained from signals from image pickup pixels in Embodiment 2.

FIG. 10 is a timing chart showing an image capturing sequence in a low-speed continuous image capturing mode and an image capturing sequence in a high-speed continuous image capturing mode in Embodiment 2.

DESCRIPTION OF THE PREFERRED EMBODIMENTS

Exemplary embodiments of the present invention will hereinafter be described with reference to the accompanying drawings.

[Embodiment 1]

Figure 1:
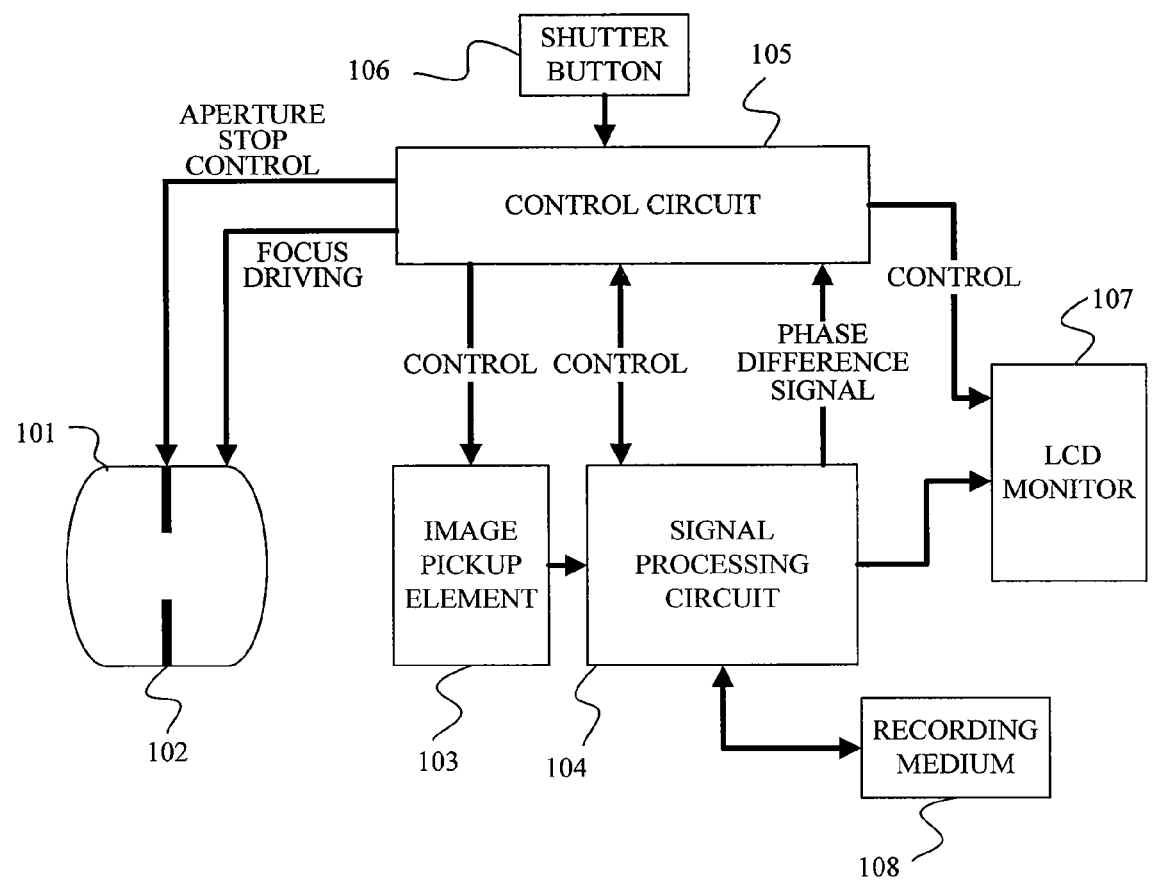
FIG. 1 is a block diagram showing a configuration of an image pickup apparatus which is Embodiment 1 of the present invention.

FIG. 1 shows a configuration of an image pickup apparatus such as a digital still camera or a video camera which is a first embodiment (Embodiment 1) of the present invention. Reference numeral 101 denotes an image taking optical system, reference numeral 102 denotes an aperture stop incorporated in the image taking optical system 101, and reference numeral 103 denotes an image pickup element constituted by a CMOS sensor.

Reference numeral 104 denotes a signal processing circuit, and reference numeral 107 denotes a monitor (display unit) such as a TFT liquid crystal display. Reference numeral 105 denotes a control circuit (controller) which controls operations of the image pickup element 103, the signal processing circuit 104 and the monitor 107. Reference numeral 106 denotes a shutter button, and reference numeral 108 denotes a recording medium such as a semiconductor memory removable from the image pickup apparatus.

An object image formed by the image taking optical system 101 is projected onto the image pickup element 103. The image pickup element 103 photoelectrically converts the object image into an electric signal to output it. An aperture diameter (aperture size) of the aperture stop 102 is set according to image capturing conditions such as object luminance, which adjusts an amount of light reaching the image pickup element 103.

The electric signal output (read out) from the image pickup element 103 is input to the signal processing circuit 104. On the image pickup element 103, plural image pickup pixels (first pixels) and plural focus detection pixels (second pixels), which will be described below, are arranged in a predetermined pattern.

Therefore, the electric signal input from the image pickup element 103 to the signal processing circuit 104 includes image pickup signals from the image pickup pixels and focus detection signals from the focus detection pixels. The signal processing circuit 104 performs processing on the image pickup signals and processing on the focus detection signals, which are mutually different.

Specifically, the signal processing circuit 104 performs image processing such as color interpolation processing and gamma processing on the image pickup signals to generate a video signal (captured image). Since no image pickup signal is obtained from the focus detection pixels, the signal processing circuit 104 performs interpolation processing using the image pickup signals from the image pickup pixels disposed in the vicinity of the focus detection pixel to generate an image pickup signal for a position of the focus detection pixel.

The video signal generated by the signal processing circuit 104 is displayed on the monitor 107, and subjected to predetermined compression processing in response to an operation of the shutter button 106 to be recorded in the recording medium 108.

Processes from the photoelectric conversion performed by the image pickup pixels to the reading-out of the image pickup signals from the image pickup pixels which are performed in response to the operation of the shutter button 106 are hereinafter collectively referred to as an "image capturing operation". Operations from the generation of the video signal using the image pickup signals to the recording of the video signal to the recording medium 108 are hereinafter collectively referred to as a "recording operation". However, the image capturing operation may include the recording operation. The same applies to other embodiments described below.

The displaying of the video signal on the monitor 107 is continued not only for a period until the shutter button 106 is operated, but also in a state where the shutter button 106 is being operated. Thus, when an image capturing mode set in the image pickup apparatus is a continuous image capturing mode, in the state where the shutter button 106 is being operated, the recording of the video signal to the recording medium 108 is repeated after every image capturing operation in continuous image capturing while the displaying of the video signal on the monitor 107 is continued.

The plural focus detection pixels on the image pickup element 103 include plural first focus detection pixels which receive a light flux that has passed through a first area of an exit pupil of the image taking optical system 101. The plural focus detection pixels further include plural second focus detection pixels which receive a light flux that has passed through a second area of the exit pupil, the second area being divided with respect to the first area.

The signal processing circuit 104 generates a first image signal by using the focus detection signals from the first focus detection pixels and a second image signal by using the focus detection signals from the second focus detection pixels. The signal processing circuit 104 performs correlation calculation between the first image signal and the second image signal to generate a phase difference signal which shows a shift amount (that is, phase difference) between the first and second image signals. The phase difference signal is input to the control circuit 105. Thus, focus detection of a phase difference detection method (hereinafter referred to as "phase difference detection method focus detection") is performed.

The control circuit 105 calculates a defocus amount of the image taking optical system 101 based on the phase difference signal input from the signal processing circuit 104, and calculates a driving amount of a focus lens (not shown) included in the image taking optical system 101. The control circuit 105 controls a focus actuator (not shown) so as to move the focus lens by the driving amount. Thus, a series of autofocus (AF) control including the photoelectric conversion performed by the focus detection pixels, the generation of the phase difference signal, the calculation of the driving amount of the focus lens and the driving of the focus lens is performed, which provides an in-focus state of the image taking optical system 101 for the object.

In the continuous image capturing mode, plural image capturing operations are performed at a predetermined time interval. Between the respective image capturing operations (operations from the photoelectric conversion performed by the image pickup pixels to the reading-out of the image pickup signals from the image pickup pixels in this embodiment), the AF control for a subsequent image capturing operation is performed.

FIGS. 2A and 2B, FIGS. 3A and 3B and FIGS. 4A and 4B show structures of the image pickup pixels and the focus detection pixels. In this embodiment, a Bayer arrangement is employed as a basic pixel arrangement in which, among four pixels arranged in 2×2 matrix form shown in FIG. 2A, two pixels (G pixels) having spectral sensitivity of green (G) are diagonally arranged and other two pixels (R pixel and B pixel) respectively having spectral sensitivity of red (R) and spectral sensitivity of blue (B) are diagonally arranged. Among the plural image pickup pixels arranged in the Bayer arrangement, the plural focus detection pixels are dispersed in a predetermined pattern.

Figure 2A:
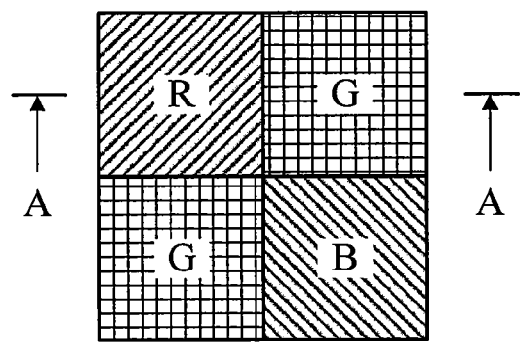
FIGS. 2A and 2B show an arrangement and structures of image pickup pixels in Embodiment 1.
Figure 2B:
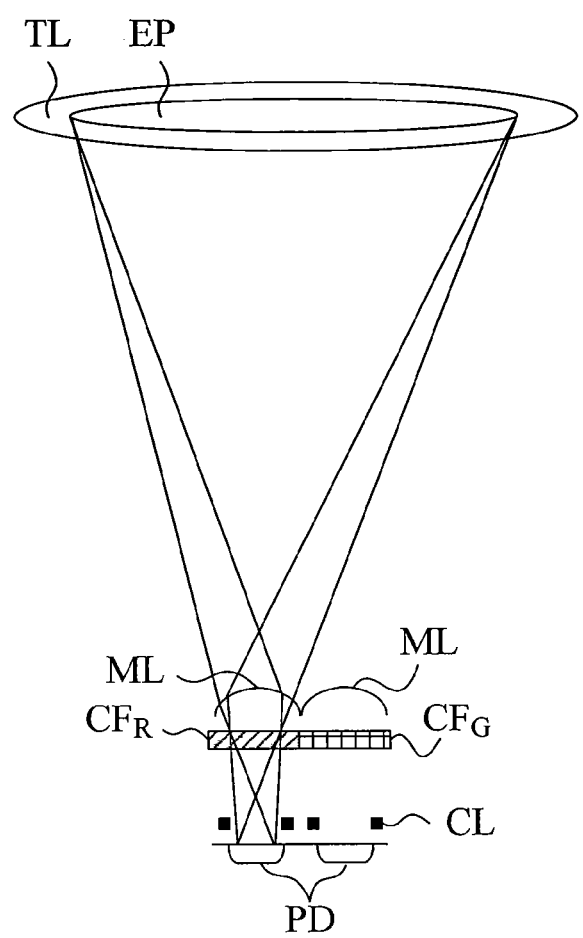

FIG. 2B shows a cross section along a line A-A in FIG. 2A. Reference character ML denotes an on-chip microlens disposed in front of each pixel. Reference character $CF_R$ denotes a color filter of R, and Reference character $CF_G$ denotes a color filter of G. Reference character PD denotes a photoelectric conversion element in the CMOS sensor (image pickup element 103) shown in FIG. 1.

Reference character CL denotes a wiring layer for forming a signal line through which various signals are transmitted in the CMOS sensor. Reference character TL denotes the image taking optical system 101, and reference character EP denotes the exit pupil of the image taking optical system 101.

The on-chip microlens ML and the photoelectric conversion element PD of the image pickup pixel are configured to capture a light flux that has passed through the image taking optical system TL as effectively as possible. In other words, the exit pupil EP of the image taking optical system TL and the photoelectric conversion element PD are arranged in a conjugate relationship by the microlens ML, and an effective area of the photoelectric conversion element PD is designed as large as possible.

Although FIG. 2B shows only a light flux entering the R pixel, other light fluxes similarly enter the G pixel and the B pixel having a same structure as that of the R pixel. Thus, a diameter of the exit pupil EP corresponding to the R, G and B pixels which are the image pickup pixels becomes large, which enables efficient capturing of the light flux from the object. As a result, an S/N ratio of the image pickup signal is improved.

Figure 3A:
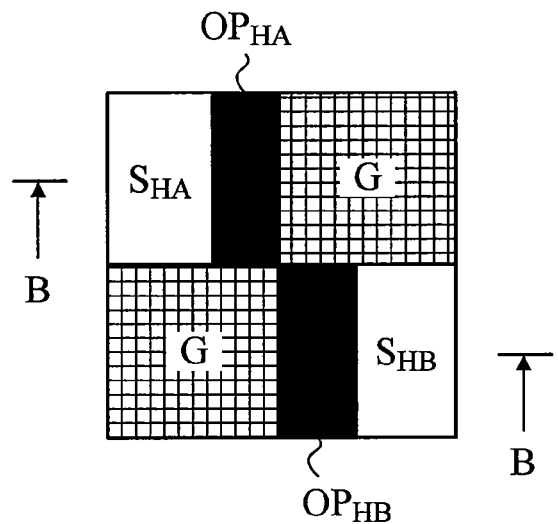
FIGS. 3A and 3B show an arrangement and structures of focus detection pixels which perform horizontal pupil division in Embodiment 1.
Figure 3B:
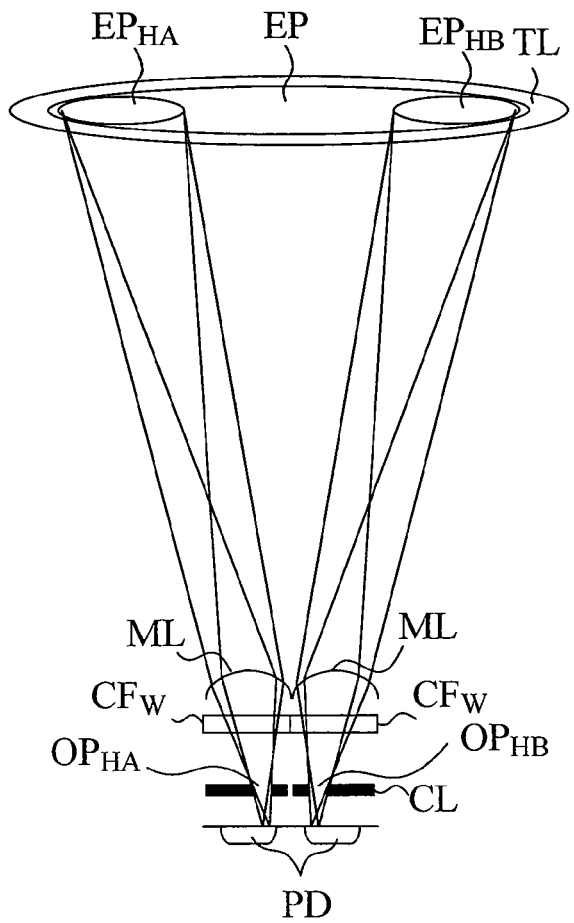

FIGS. 3A and 3B respectively show arrangement and structures of the focus detection pixels for dividing the exit pupil of the image taking optical system 101 in a horizontal direction (lateral direction). The division of the exit pupil is hereinafter referred to as "pupil division". The horizontal direction (lateral direction) means a direction along a straight line orthogonal to an optical axis of the image taking optical system 101 and extending parallel to a ground when the image pickup apparatus is held such that the optical axis and a long side of the image pickup element (image pickup surface) 103 is parallel to the ground.

FIG. 3A shows four pixels arranged in 2×2 matrix form including two focus detection pixels. In a case of generating a video signal for recording or viewing, a main component of luminance information is obtained from a G pixel. Image recognition characteristics of humans are sensitive to the luminance information, and hence image quality deterioration is easily recognized when the G pixel is lacked. On the other hand, an R pixel and a B pixel are pixels for obtaining color information (color difference information). Visual characteristics of humans are insensitive to the color information, and hence the image quality deterioration is difficult to be recognized even when the pixels for obtaining the color information are slightly lacked. Thus, in this embodiment, among the four pixels arranged in 2×2 matrix form, the G pixels are used as the image pickup pixels while the R and B pixels are replaced by the focus detection pixels.

In FIG. 3A, the focus detection pixels are denoted by $S_{HA}$ and $S_{HB}$. The focus detection pixels $S_{HA}$ and $S_{HB}$ respectively correspond to the first focus detection pixel and the second focus detection pixel described above.

FIG. 3B shows a cross section along a line B-B in FIG. 3A. FIG. 3B shows a diameter of the exit pupil EP of the image taking optical system TL with a size that enables phase difference detection by the focus detection pixels.

The microlens ML and the photoelectric conversion element PD have same structures as those in the image pickup pixel shown in FIG. 2B. Since no focus detection signal from the focus detection pixel is used for generating the video signal, the focus detection pixel is provided with a transparent (white) film $CF_W$ in place of a color filter for color separation.

In order to perform the pupil division in the horizontal direction (hereinafter referred to as "horizontal pupil division"), each of aperture portions formed in the wiring layer CL is shifted to one side in the horizontal direction with respect to a center line of the microlens ML. Specifically, an aperture portion $OP_{HA}$ formed for the focus detection pixel $S_{HA}$ is shifted rightward, which causes a light flux that has passed through a left side exit pupil (first area) $EP_{HA}$ of the image taking optical system TL to enter the focus detection pixel $S_{HA}$. On the other hand, an aperture portion $OP_{HB}$ formed for the focus detection pixel $S_{HB}$ is shifted leftward, which causes a light flux that has passed through a right side exit pupil (second area) $EP_{HB}$ of the image taking optical system TL to enter the focus detection pixel $S_{HB}$.

In this embodiment, a partial optical image of an object formed on the plural focus detection pixels $S_{HA}$ regularly arranged in the horizontal direction is defined as an A image. A partial optical image of the object formed on the plural focus detection pixels $S_{HB}$ regularly arranged in the horizontal direction is defined as a B image. Detecting a relative positional relationship (shift amount) between the A image and the B image enables acquisition of an out-of-focus amount (defocus amount) of the image taking optical system TL for the object having the horizontal luminance distribution.

The use of the focus detection pixels $S_{HA}$ and $S_{HB}$ enables the focus detection for an object such as a vertical line having a horizontal luminance distribution, but does not enable the focus detection for an object such as a horizontal line having a vertical luminance distribution (longitudinal luminance distribution). Therefore, this embodiment includes, in order to enable the focus detection for the object having the vertical luminance distribution, focus detection pixels for performing the pupil division in the vertical direction (hereinafter referred to as "vertical pupil division"). The vertical direction (longitudinal direction) means a direction along a straight line orthogonal to the optical axis of the image taking optical system 101 and extending in an up-and-down direction when the image pickup apparatus is held such that the optical axis and the long side of the image pickup element (image pickup surface) 103 is parallel to the ground.

As obvious from FIG. 3B, when the exit pupil EP of the image taking optical system 101 has a diameter which cannot include the left and right exit pupils $EP_{HA}$ and $EP_{HB}$, only an insufficient amount of light reaches the focus detection pixels $S_{HA}$ and $S_{HB}$, and therefore good focus detection cannot be performed.

Figure 4A:
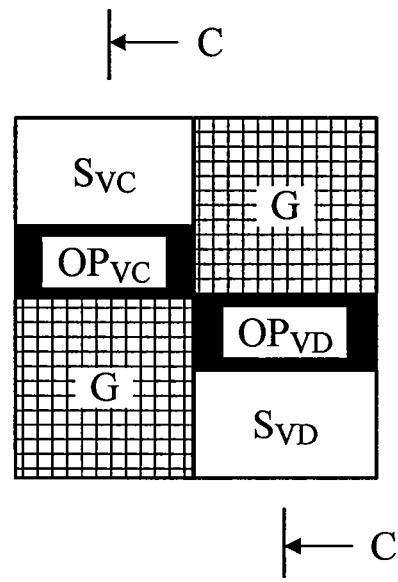
FIGS. 4A and 4B show an arrangement and structures of focus detection pixels which perform vertical pupil division in Embodiment 1.
Figure 4B:
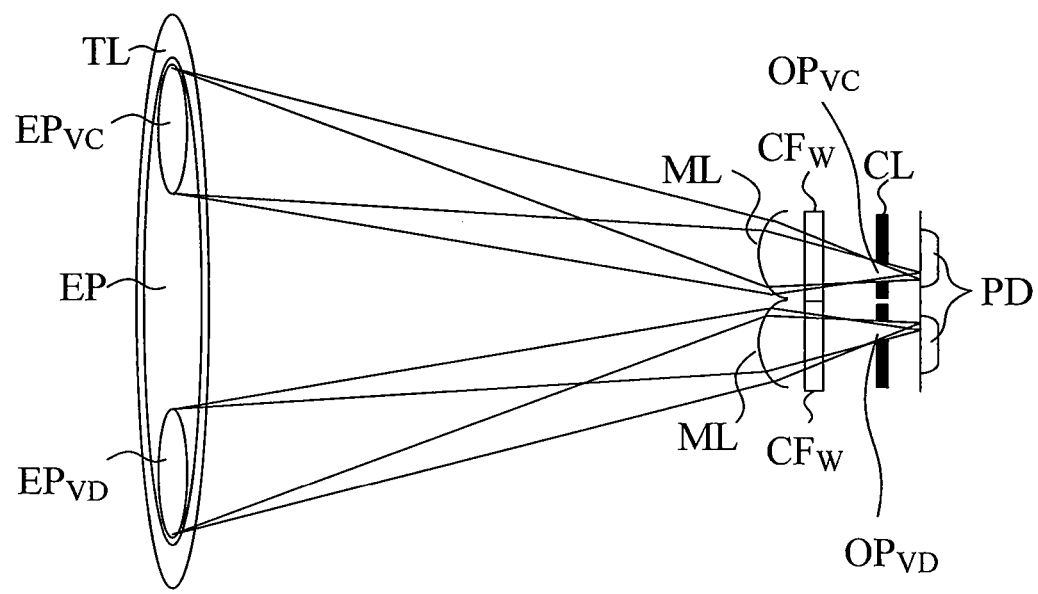

FIGS. 4A and 4B respectively show arrangement and structures of the focus detection pixels for performing the vertical pupil division. FIG. 4A shows four pixels arranged in 2×2 matrix form including two focus detection pixels. As in the horizontal direction, the G pixel is used as the image pickup pixels while the R pixel and the B pixel are replaced by the focus detection pixels. In FIG. 4A, the two focus detections pixels are denoted by $S_{VC}$ and $S_{VD}$.

FIG. 4B shows a cross section along a line C-C in FIG. 4A. In FIG. 4B, a diameter of the exit pupil EP of the image taking optical system TL is shown with a size that enables phase difference detection by the focus detection pixels.

The focus detection pixels $S_{VC}$ and $S_{VD}$ shown in FIG. 4B have structures for the vertical pupil division while the focus detection pixels $S_{HA}$ and $S_{HB}$ shown in FIG. 3B have the structures for the horizontal pupil division. The structures themselves of the focus detection pixels $S_{VC}$ and $S_{VD}$ are the same as those of the focus detection pixels $S_{HA}$ and $S_{HB}$.

In order to perform the vertical pupil division, each of aperture portions formed in the wiring layer CL is shifted to one side in the vertical direction with respect to the center line of the microlens ML. Specifically, an aperture portion $OP_{VC}$ formed for the focus detection pixel $S_{VC}$ is shifted downward, which causes a light flux that has passed through an upper side exit pupil (first area) $EP_{VC}$ of the image taking optical system TL to enter the focus detection pixel $S_{VC}$. On the other hand, an aperture portion $OP_{VD}$ formed for the focus detection pixel $S_{VD}$ is shifted upward, which causes a light flux that has passed through a lower side exit pupil (second area) $EP_{VD}$ of the image taking optical system TL to enter the focus detection pixel $S_{VD}$.

In this embodiment, a partial optical image of the object formed on the plural focus detection pixels $S_{VC}$ regularly arranged in the vertical direction is defined as a C image. A partial optical image of the object formed on the plural focus detection pixels $S_{VD}$ regularly arranged in the vertical direction is defined as a D image. Detecting a relative positional relationship (shift amount) between the C image and the D image enables acquisition of an out-of-focus amount (defocus amount) of the image taking optical system TL for the object having the vertical luminance distribution.

Figure 5:
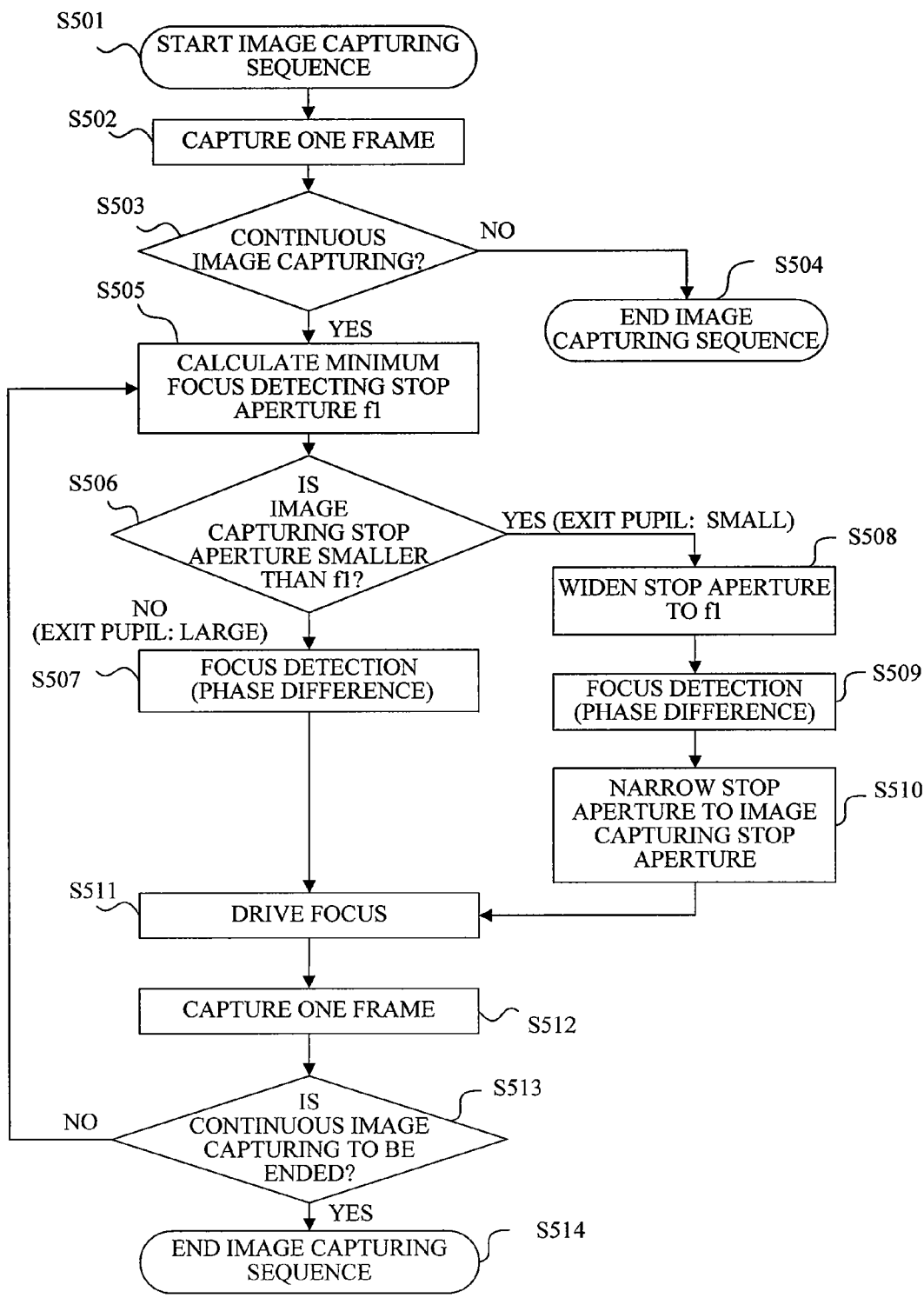
FIG. 5 is a flowchart showing an operation of the image pickup apparatus of Embodiment 1.

A flowchart of FIG. 5 shows operations (control method) of the image pickup apparatus (mainly, of the control circuit 105). The operations are performed according to a computer program stored in a memory (not shown) provided in the control circuit 105.

At step S501, when the shutter button 106 is operated by a user, the control circuit 105 starts its operation (image capturing sequence). The control circuit 105 sets an aperture diameter of the aperture stop 102 (the aperture diameter is hereinafter simply referred to as a "stop aperture") to an image capturing stop aperture (image capturing aperture size) f0 which is a stop aperture appropriate for image capturing and decided according to object luminance, a sensitivity of the image pickup element 103 and a shutter speed (charge accumulation time period), and then causes the image pickup element 103 to perform photoelectric conversion (charge accumulation). Thus, at step S502, the control circuit 105 performs the image capturing operation to obtain one captured image (hereinafter referred to as "one frame"). The recording operation of the captured image obtained by this image capturing operation is performed separately from the sequence of FIG. 5.

Next, at step S503, the control circuit 105 determines whether or not the image capturing mode set by the user is the continuous image capturing mode. If the set image capturing mode is not the continuous image capturing mode, the control circuit 105 at step S504 directly ends the image capturing sequence. If the set image capturing mode is the continuous image capturing mode, the control circuit 105 at step S505 calculates a minimum focus detecting stop aperture (focus detecting aperture size) f1 which is a stop aperture corresponding to a light amount necessary for the phase difference detection method focus detection.

In this embodiment, plural focus detection areas are set in the image pickup element (image pickup area) 103, and one focus detection area can be selected by the control circuit 105 or the user who performs a selecting operation from the plural focus detection areas. The selected focus detection area is hereinafter referred to as an "active focus detection area".

The stop aperture at which pupil vignetting occurs is different depending on a position of the active focus detection area. Therefore, at step S505, the control circuit 105 sets the minimum focus detecting stop aperture f1 to a value different according to the active focus detection area selected at the image capturing.

Next, at step S506, the control circuit 105 determines whether or not the image capturing stop aperture f0 is smaller than the minimum focus detecting stop aperture f1. If the image capturing stop aperture f0 is larger than the minimum focus detecting stop aperture f1, the control circuit 105 at step S507 performs the phase difference detection method focus detection with keeping the stop aperture equal to f0. Then, the control circuit 105 proceeds to step S511.

On the other hand, if the image capturing stop aperture f0 is smaller than the minimum focus detecting stop aperture f1, the control circuit 105 at step S508 widens (increases) the stop aperture to f1. Then, at step S509, the control circuit 105 performs the phase difference detection method focus detection. Thereafter, at step S510, the control circuit 105 narrows the stop aperture to f0, and then proceeds to step S511.

At step S511, the control circuit 105 drives the focus lens based on a result of the focus detection. At step S512, the control circuit 105 performs an image capturing operation for subsequent one frame.

At step S513, the control circuit 105 determines whether or not the shutter button 106 is still in an operated state, in other words, whether or not the continuous image capturing is to be continued or ended. If the continuous image capturing is to be ended, the control circuit 105 at step S514 directly ends the image capturing sequence. If the continuous image capturing is to be continued, the control circuit 105 returns to step S505 to set the minimum focus detecting stop aperture f1 for the focus detection performed before a subsequent image capturing operation. Then, the control circuit 105 repeats the operations of steps S506 to S512.

FIG. 6 shows a time-sequential flow of the image capturing operation when the continuous image capturing mode is set at step S503 of FIG. 5. In FIG. 6, (a) shows a case where the image capturing stop aperture f0 is larger than the minimum focus detecting stop aperture f1 (or equal to or more than f1), and (b) shows a case where the image capturing stop aperture f0 is smaller than the minimum focus detecting stop aperture f1. Turning on/off of the shutter button 106 is performed at same timings in the cases (a) and (b).

In the case (a), when the shutter button 106 is operated to be turned "ON", the stop aperture is set to the image capturing stop aperture f0, and the photoelectric conversion (charge accumulation) is performed by the image pickup pixels in the image pickup element 103. After a predetermined charge accumulation time period has elapsed, the image pickup signals are read out from the image pickup pixels. Then, the photoelectric conversion (charge accumulation) by the focus detection pixels is performed with keeping the stop aperture equal to the image capturing stop aperture f0.

After a charge accumulation time period appropriate for the focus detection has elapsed, the focus detection signals are read out from the focus detection pixels, and then signal processing for the phase difference detection and calculation of the driving amount of the focus lens are performed. After the focus lens has been driven, the photoelectric conversion by the image pickup pixels for the subsequent image capturing operation is started. Such an image capturing sequence is repeated until the operation of the shutter button 106 is released (that is, turned "OFF").

In the case (b), when the shutter button 106 is operated to be turned "ON", the stop aperture is set to the image capturing stop aperture f0, and then the photoelectric conversion (charge accumulation) is performed by the image pickup pixels in the image pickup element 103. After the predetermined charge accumulation time period has elapsed, the image pickup signals are read out from the image pickup pixels. Then, after the stop aperture has been widened (increased) from the image capturing stop aperture f0 to the minimum focus detecting stop aperture f1, the photoelectric conversion (charge accumulation) by the focus detection pixels is performed.

After the charge accumulation time period appropriate for the focus detection has elapsed, the focus detection signals are read out from the focus detection pixels, and then the signal processing for the phase difference detection and the calculation of the driving amount of the focus lens are performed. After the focus lens has been driven, the stop aperture is narrowed from the minimum focus detecting stop aperture f1 to the image capturing stop aperture f0, and then the photoelectric conversion by the image pickup pixels for the subsequent image capturing operation is started. Such an image capturing sequence is repeated until the operation of the shutter button 106 is released (that is, turned "OFF").

According to this embodiment, in the continuous image capturing mode, even in the case where the image capturing stop aperture f0 cannot provide the light amount necessary for the phase difference detection method focus detection to the focus detection pixels, the stop aperture is increased to the minimum focus detecting stop aperture f1 when the focus detection is performed. This enables provision of the light amount necessary for the phase difference detection method focus detection to the focus detection pixels at the time of the focus detection, which enables continuous image capturing with good focus detection.

[Embodiment 2]

Embodiment 1 has described the case where the time period between the image capturing operations in the continuous image capturing mode is long enough to perform the phase difference detection method focus detection therewithin. However, there is an image pickup apparatus in which the time period between the image capturing operations is too short to perform the phase difference detection method focus detection therewithin, in other words, a high-speed continuous image capturing mode can be selected. A second embodiment (Embodiment 2) of the present invention will hereinafter describe an image pickup apparatus which enables selection of the high-speed continuous mage capturing mode.

FIG. 7 shows a configuration of the image pickup apparatus of Embodiment 2. Components identical to those shown in FIG. 1 are denoted by the same reference numerals, and description thereof will be omitted.

In FIG. 7, reference numeral 704 denotes a signal processing circuit which performs focus detection of a contrast detection method (hereinafter referred to as "contrast detection method focus detection") in addition to processing similar to that of the signal processing circuit 104 shown in FIG. 1.

An object image formed by an image taking optical system 101 is projected onto an image pickup element 103. The image pickup element 103 photoelectrically converts the object image into an electric signal to output it. An aperture diameter (aperture size) of an aperture stop 102 is set according to image capturing conditions such as object luminance, which adjusts an amount of light reaching the image pickup element 103.

The electric signal output (read out) from the image pickup element 103 is input to the signal processing circuit 704. On the image pickup element 103, as described in Embodiment 1, plural image pickup pixels (first pixels) and plural focus detection pixels (second pixels) are arranged in a predetermined pattern.

Therefore, the electric signal input from the image pickup element 103 to the signal processing circuit 704 includes image pickup signals from the image pickup pixels and focus detection signals from the focus detection pixels. The signal processing circuit 704 performs processing on the image pickup signals and processing on the focus detection signals, which are mutually different.

Specifically, the signal processing circuit 704 performs image processing such as color interpolation processing and gamma processing on the image pickup signals to generate a video signal (captured image). Since no image pickup signal is obtained from the focus detection pixels, the signal processing circuit 704 performs interpolation processing using the image pickup signals from the image pickup pixels disposed in the vicinity of the focus detection pixel to generate an image pickup signal for a position of the focus detection pixel.

The signal processing circuit 704 extracts a contrast signal (contrast information) which shows a difference between pixel signals equivalent to the image pickup signals from the image pickup pixels adjacent to each other from the generated video signal. The contrast signal is input to a control circuit 705.

The video signal generated by the signal processing circuit 704 is displayed on the monitor 107, and subjected to predetermined compression processing in response to an operation of a shutter button 106 to be recorded in a recording medium 108.

The displaying of the video signal on the monitor 107 is continued not only for a period until the shutter button 106 is operated, but also in a state where the shutter button 106 is being operated. Thus, when an image capturing mode set in the image pickup apparatus is a continuous image capturing mode, in the state where the shutter button 106 is being operated, the recording of the video signal to the recording medium 108 is repeated after every image capturing operation in continuous image capturing while the displaying of the video signal on the monitor 107 is continued.

As in Embodiment 1, the plural focus detection pixels on the image pickup element 103 include plural first focus detection pixels which receive a light flux that has passed through a first area of an exit pupil of the image taking optical system 101. The plural focus detection pixels further include plural second focus detection pixels which receive a light flux that has passed through a second area of the exit pupil, the second area being divided with respect to the first area.

The signal processing circuit 704 generates a first image signal by using the focus detection signals from the plural first focus detection pixels and a second image signal by using the focus detection signals from the plural second focus detection pixels. The signal processing circuit 704 performs correlation calculation between the first image signal and the second image signal to generate a phase difference signal which shows a shift amount (phase difference) between the first and second image signals. The phase difference signal is input to the control circuit 705. Thus, the phase difference detection method focus detection is performed.

The control circuit 705 further performs, as described below, the contrast detection method focus detection by using the contrast signal input from the signal processing circuit 704 to drive the focus lens such that a level of the contrast signal becomes a maximum. During the continuous image capturing, the contrast detection method focus detection for a subsequent image capturing operation is performed by extracting the contrast signal from the video signal (captured image) generated using the image pickup signals obtained by the photoelectric conversion by the image pickup pixels in a precedent image capturing operation.

The extraction of the contrast signal from the video signal is performed through the following procedure. FIG. 8 shows pixel signals (hereinafter also simply referred to as "pixels") generated by using the image pickup signals from the image pickup pixels adjacent to each other in the video signal generated by the signal processing circuit 704. In the drawing, a center pixel a(m, k) denotes an attention pixel, and pixels a(m±n, k±l) (n, l=1, 2, 3, . . . ) arranged around the center pixel a(m, k) denote pixels adjacent to the attention pixel a(m, k).

The contrast signal is extracted by performing the following calculation with reference to the attention pixel a(m, k).

A horizontal edge signal EdgeH, a vertical edge signal EdgeV and a two-dimensional edge signal Edge2D are respectively represented by the following expressions:

$$EdgeH = \{a(m, k) \times 2 - a(m-n, k) - a(m+n, k)\}/2$$

$$EdgeV = \{a(m, k) \times 2 - a(m, k-1) - a(m, k-1)\}/2$$

$$Edge2D = \{a(m, k) \times 4 - a(m-n, k) - a(m+n, k) - a(m, k-1) - a(m, k-1)\}/4.$$

In the expressions, n and l respectively denote correlation distances from the attention pixel a(m, k) in the horizontal and vertical directions. Optimal values of n and l vary depending on resolution on a focal plane of the image taking optical system 101 or the like, but are generally set to values of about 2 to 8.

Then, absolute values of the respective edge signals are integrated in an active focus detection area selected by the control circuit 705 or a user to generate the contrast signal.

In the image pickup apparatus of this embodiment, a low-speed continuous image capturing mode (first continuous image capturing mode) and a high-speed continuous image capturing mode (second continuous image capturing mode) is selectable through an operating of a continuous image capturing mode switch (not shown).

Figure 9:
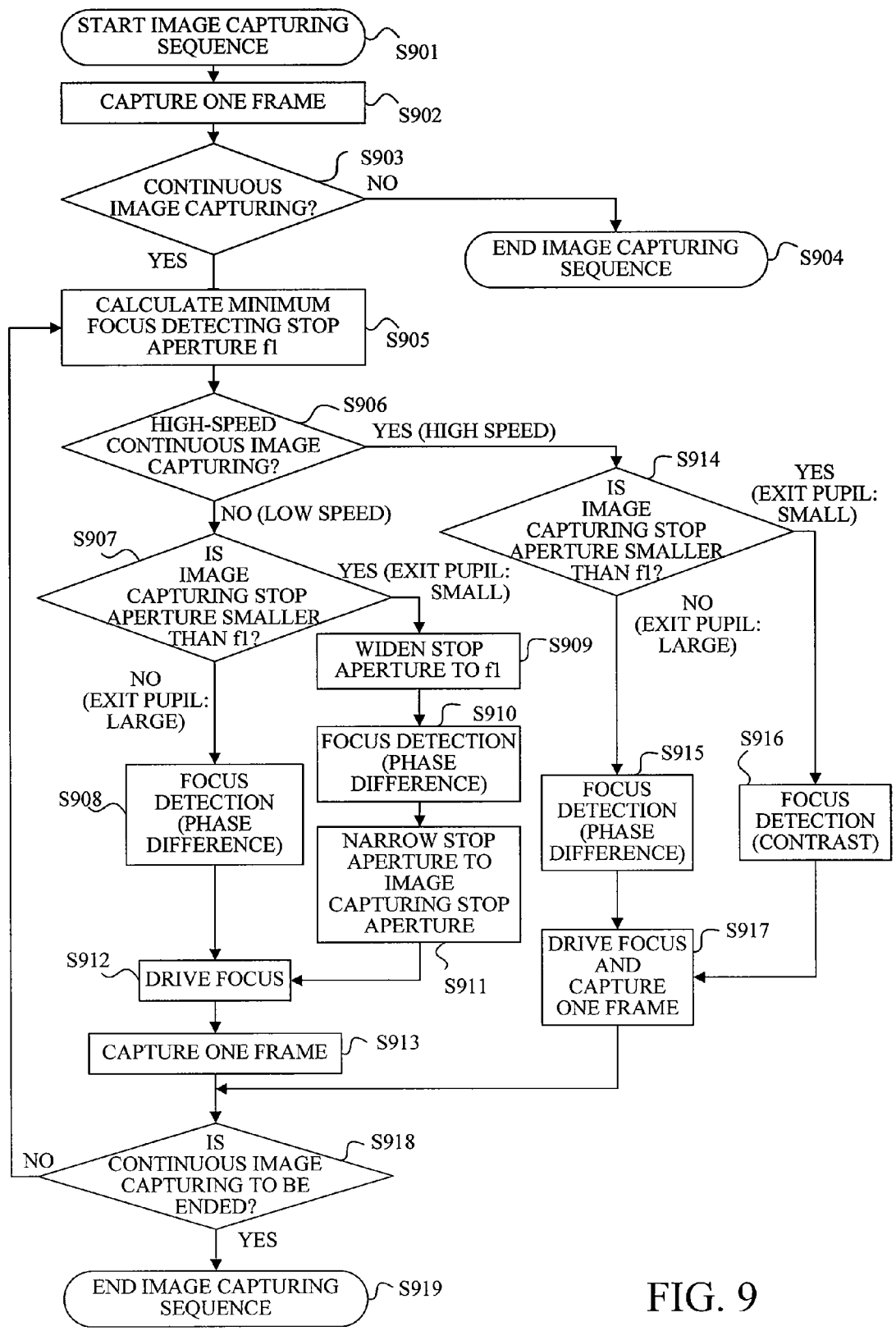
FIG. 9 is a flowchart showing an operation of the image pickup apparatus of Embodiment 2.

A flowchart of FIG. 9 shows operations (control method) of the image pickup apparatus (mainly, of the control circuit 705). The operations are performed according to a computer program stored in a memory (not shown) provided in the control circuit 705.

At step S901, when the shutter button 106 is operated by a user, the control circuit 705 starts its operation (image capturing sequence). At steps S902 to S905, the control circuit 705 performs processes similar to those at steps S502 to S505 shown in FIG. 5 in Embodiment 1. Specifically, at step S902, the control circuit 705 sets an stop aperture to an image capturing stop aperture (image capturing aperture size) f0 to perform an image capturing operation for obtaining one frame. Then, when having determined at step S903 that the continuous image capturing mode is set, the control circuit 705 at step S905 calculates a minimum focus detecting stop aperture f1 which is a stop aperture corresponding to a light amount necessary for the phase difference detection method focus detection.

Next, at step S906, the control circuit 705 determines whether the set continuous image capturing mode is the high-speed continuous image capturing mode or the low-speed continuous image capturing mode. If the set continuous image capturing mode is the low-speed continuous image capturing mode, the control circuit 705 at steps S907 to S913 performs processes similar to those at steps S506 to S512 shown in FIG. 5 in Embodiment 1.

Specifically, when having determined at step S907 that the image capturing stop aperture f0 is larger than the minimum focus detecting stop aperture f1, the control circuit 705 at step S908 performs the phase difference detection method focus detection with keeping the stop aperture at f0, and then proceeds to step S912. When having determined at step S907 that the image capturing stop aperture f0 is smaller than the minimum focus detecting stop aperture f1, the control circuit 705 at step S909 widens (increases) the stop aperture to f1. Then, at step S910, the control circuit 705 performs the phase difference detection method focus detection. Thereafter, at step S911, the control circuit 705 narrows the stop aperture to f0, and then proceeds to step S912.

At step S912, the control circuit 705 drives the focus lens based on a result of the phase difference detection method focus detection. At step S913, the control circuit 705 performs the image capturing operation for subsequent one frame, and then proceeds to step S918.

On the other hand, also when having determined at step S906 that the set continuous image capturing mode is the high-speed continuous image capturing mode, the control circuit 705 at step S914 determines whether the image capturing stop aperture f0 is smaller than the minimum focus detecting stop aperture f1 as at step S907. If the image capturing stop aperture f0 is larger than the minimum focus detecting stop aperture f1, the control circuit 705 at step S915 performs the phase difference detection method focus detection with keeping the stop aperture at f0.

In this embodiment, the phase difference detection method focus detection is performed by using the focus detection signals obtained by the photoelectric conversion performed by the focus detection pixels in the precedent image capturing operation. This is because a time period between the image capturing operations in the high-speed continuous image capturing mode is short, and hence processing from start of the photoelectric conversion (charge accumulation) by the focus detection pixels to generation of the phase difference signal cannot be performed within the short time period.

On the other hand, when having determined at step S914 that the image capturing stop aperture f0 is smaller than the minimum focus detecting stop aperture f1, the control circuit 705 at step S916 performs the contrast detection method focus detection by using the contrast signal. This is because the time period between the image capturing operations in the high-speed continuous image capturing mode is short, and hence the phase difference detection method focus detection which is started from the photoelectric conversion by the focus detection pixels after the stop aperture is widened to the minimum focus detecting stop aperture f1 cannot be performed. The contrast signal, as described above, is extracted from the video signal (captured image) generated by using the image pickup signals obtained by the photoelectric conversion performed by the image pickup pixels in the precedent image capturing operation.

The control circuit 705 proceeds from steps S915 and S916 to step S917 to drive the focus lens based on a result of the contrast detection method focus detection at step S915 or S916, and then performs an image capturing operation for subsequent one frame. Thereafter, the control circuit 705 proceeds to step S918.

At Step S918, the control circuit 705 determines whether or not the shutter button 106 is still in an operated state, in other words, whether the continuous image capturing is to be continued or ended. If the continuous image capturing is to be ended, the control circuit 705 at step S919 directly ends the image capturing sequence. If the continuous image capturing is to be continued, the control circuit 705 returns to step S905 to set the minimum focus detection stop aperture f1 for next focus detection. Then, the control circuit 705 repeats the processes from step S906 to step S917.

FIG. 10 shows time-sequential flows of the image capturing operations in the low-speed continuous image capturing mode (a) and in the high-speed continuous capturing mode (b). The time-sequential flow of the low-speed continuous image capturing mode (a) is the same as that of the image capturing operation described by using (b) in FIG. 6 in Embodiment 1.

On the other hand, in the high-speed continuous capturing mode (b) in FIG. 10, between a precedent image capturing operation and a subsequent image capturing operation, there is only a time period for reading out signals corresponding to charges accumulated in the pixels of the image pickup element 103 in the precedent image capturing operation. Thus, as described above with reference to the flowchart of FIG. 9, the phase difference detection method focus detection and the contrast detection method focus detection for the subsequent image capturing operation are performed respectively based on the focus detection signals and the image pickup signals corresponding to the charges accumulated in the image pickup element 103 in the precedent image capturing operation.

In the high-speed continuous image capturing mode (b) in FIG. 10, a sequence block described as "SIGNAL PROCESSING" includes processing for generating the video signal from the image pickup signals, processing for extracting the contrast signal and processing for generating the phase difference signal by using the focus detection signals from the focus detection pixels.

As described above, in this embodiment, in the high-speed continuous image capturing mode, when the image capturing stop aperture f0 is larger than the minimum focus detecting stop aperture f1, the phase difference detection method focus detection is performed by using the focus detection signal obtained by the photoelectric conversion performed by the image pickup pixels in the precedent image capturing operation. On the other hand, when the image capturing stop aperture f0 is smaller than the minimum focus detection stop aperture f1, the contrast detection method focus detection is performed by using the image pickup signals (video signal) obtained by the photoelectric conversion performed by the image pickup pixels in the precedent image capturing operation. As a result, even in the high-speed continuous image capturing mode in which the time period between the image capturing operations is short, the continuous image capturing can be performed with good focus detection.

[Embodiment 3]

In each of the aforementioned embodiments, since the focus detection pixels can be uniformly arranged on the image pickup element, the phase difference detection method focus detection can be performed in any focus detection area in the image pickup element. Further, in Embodiment 2, the contrast detection method focus detection can be performed in any focus detection area in the image pickup element.

Figure 11:
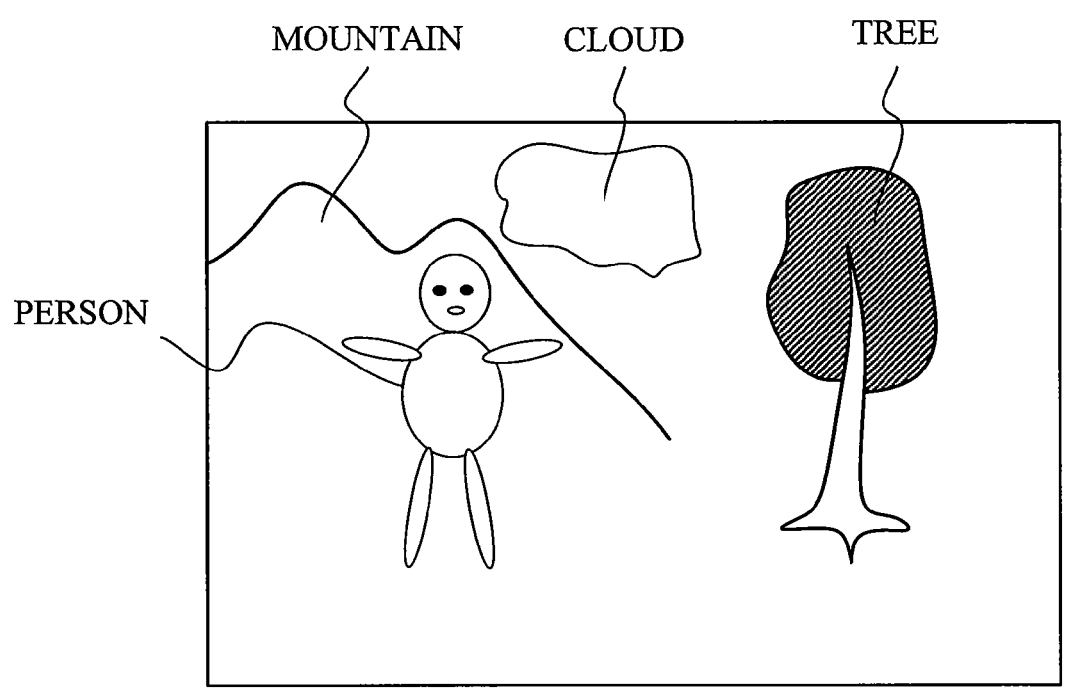
FIG. 11 is a schematic view showing object images.

However, depending on conditions of an object, performing the focus detection only in a specific focus detection area in the image pickup element can provide a better focus detection result. FIG. 11 shows an example in this case.

In FIG. 11, a person is present at a position near an image pickup apparatus, a tree is present at an intermediate distance position, and a mountain and a cloud floating in a sky are present at far distance positions. In such a scene, it is generally desirable that the image pickup apparatus be in focus on one of the near person and the far mountain.

Figures 12A, 12B:
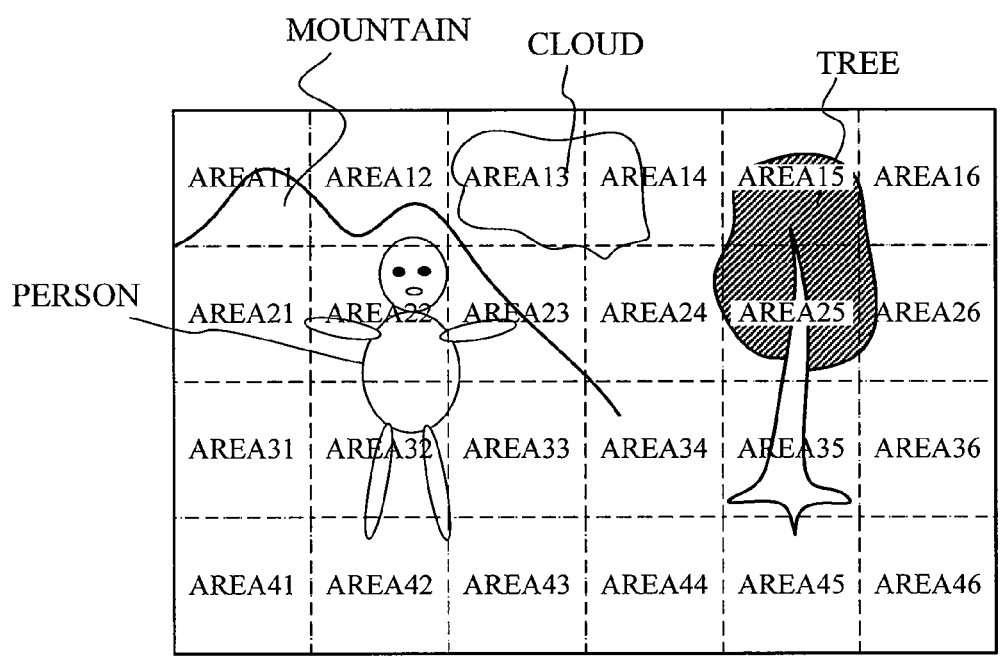
FIGS. 12A and 12B show arrangement of focus detection areas.

FIG. 12A shows plural focus detection areas formed in the image pickup element. Among the plural (twenty-four) focus detection areas, one focus detection area (hereinafter referred to as an "active focus detection area") can be selected as an area where the phase difference detection method focus detection and the contrast detection method focus detection are performed. FIG. 12B shows a relationship between the plural focus detection areas and the scene shown in FIG. 11.

In this scene, various objects such as the human, the tree, the mountain and the cloud floating in the sky exist, and these objects have various luminances. Depending on a user's intension, an object to be included within a dynamic range of a captured image and an object to be focused on do not always match each other. The focus detection pixel and the image pickup pixel do not always match each other in sensitivity depending on a difference of their pixel aperture sizes or presence or absence of a color filter.

Thus, an image pickup apparatus of a third embodiment (Embodiment 3) of the present invention decides a stop aperture appropriate for performing the phase difference detection method focus detection at the active focus detection area, based on a signal level of the image pickup pixels (that is, a level of the video signal or the captured image) obtained at the active focus detection area in an image capturing operation. Further, the image pickup apparatus of this embodiment decides a charge accumulation time period of the focus detection pixels based on the signal level of the image pickup pixels.

Figure 13:
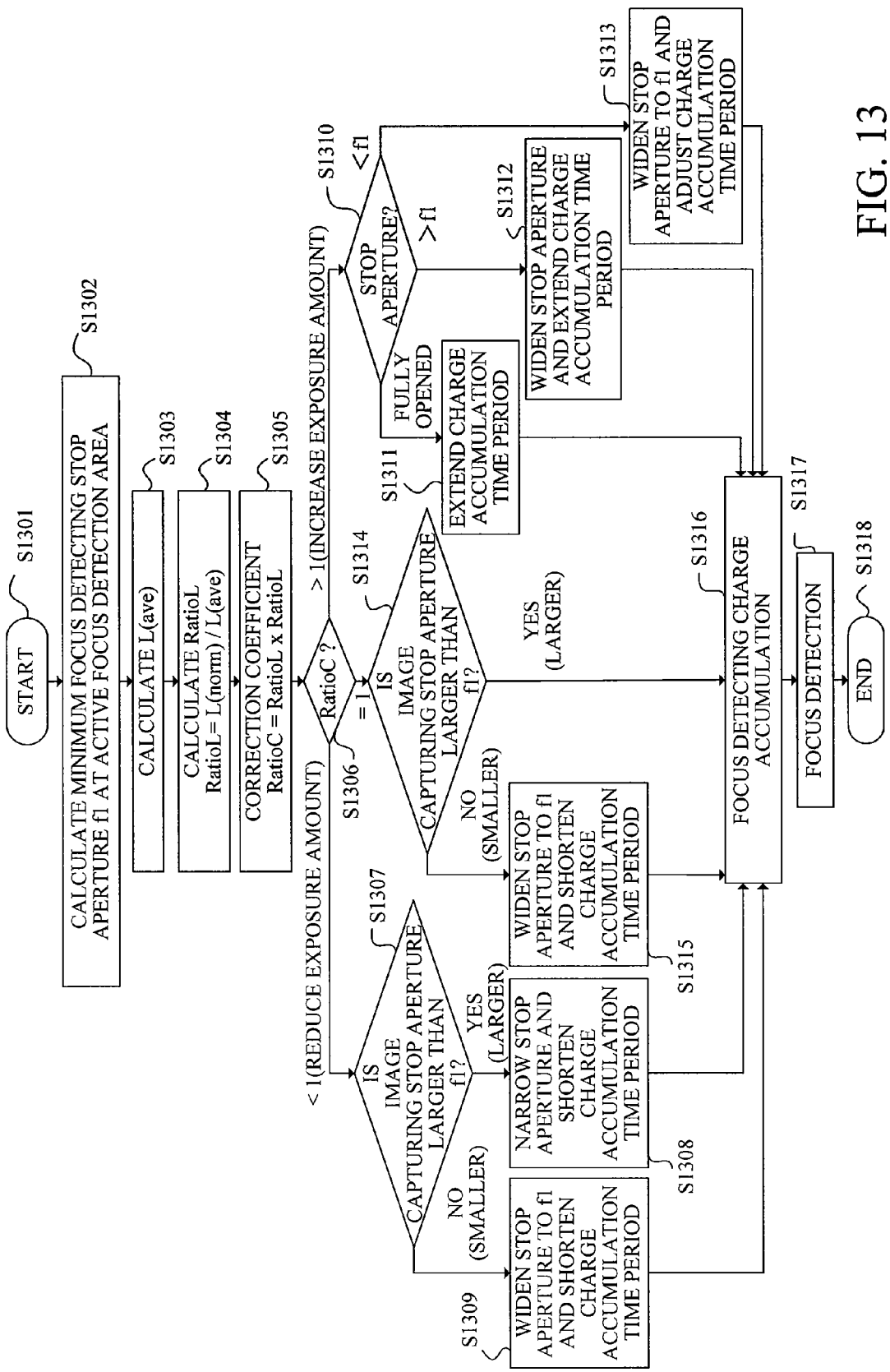
FIG. 13 is a flowchart showing determination processing of exposure conditions in phase difference detection in an image pickup apparatus which is Embodiment 3 of the present invention.

A flowchart of FIG. 13 shows a determination sequence of the stop aperture and the charge accumulation time period of the focus detection pixel when the phase difference detection method focus detection is performed in the image pickup apparatus of this embodiment.

After an image capturing operation for one frame has been finished, the control circuit (105 in FIG. 1 or 705 in FIG. 7) at step S1301 starts the sequence.

At step S1302, the control circuit calculates at the active focus detection area a minimum focus detecting stop aperture f1 which is a stop aperture corresponding to a light amount necessary for the phase difference detection method focus detection.

Next, at step S1303, the control circuit calculates an average value L(ave) of levels of the video signal obtained at the active focus detection area in the image capturing operation.

Next, at step S1304, the control circuit calculates a ratio RatioL of the average value L(ave) calculated at step S1303 to an appropriate (normal) video signal level L(norm) by using the following expression:

$$RatioL = L(norm)/L(ave).$$

Next, at step S1305, the control circuit calculates, based on the RatioL calculated at step S1304 and a ratio RatioS of sensitivity of the image pickup pixel to sensitivity of the focus detection pixel, a correction coefficient RatioC by using the following expression:

$$RadioC = ratioL \times RatioS.$$

Then, at step S1306, the control circuit determines whether or not the RatioC is 1, and whether or not the RatioC is smaller than 1. If the RatioC is smaller than 1, the control circuit corrects the stop aperture and the charge accumulation time period of the focus detection pixel so as to reduce an exposure amount for the image pickup element in the focus detection as compared with that in the image capturing operation.

At Step S1307, the control circuit determines whether or not the stop aperture for the image capturing operation (image capturing stop aperture) is larger than the minimum focus detecting stop aperture f1. If the image capturing stop aperture is larger than f1, the control circuit at step S1308 narrows the stop aperture for the phase difference detection method focus detection (focus detecting stop aperture), and shortens the charge accumulation time period for the phase difference detection method focus detection (focus detecting charge accumulation time period). This makes it possible to provide an appropriate exposure amount for the phase difference detection method focus detection at the active focus detection area.

If the image capturing stop aperture is smaller than the minimum focus detecting stop aperture f1 at step S1307, the control circuit at step S1309 widens the focus detecting stop aperture to f1, and shortens the focus detecting charge accumulation time period. This also makes it possible to provide an appropriate exposure amount for the phase difference detection method focus detection at the active focus detection area.

If the correction coefficient RatioC is larger than 1 at step S1306, the control circuit corrects the focus detecting stop aperture and the focus detecting charge accumulation time period of the focus detection pixels so as to increase an exposure amount for the image pickup element in the phase difference detection method focus detection as compared with that in the image capturing operation.

In this case, the control circuit at step S1310 determines whether or not the image capturing stop aperture is a fully opened aperture, and whether or not the image capturing stop aperture is larger than the minimum focus detecting stop aperture f1. If the stop aperture is the fully opened aperture, since the stop aperture cannot be further opened for increasing the exposure amount, the control circuit at step S1311 increases the exposure amount in the phase difference detection method focus detection by extending the focus detecting charge accumulation time period of the focus detection pixels.

On the other hand, if the image capturing stop aperture is larger than f1 at step S1310, the control circuit at step S1312 widens the focus detecting stop aperture, and extends the focus detecting charge accumulation time period to increase the exposure amount. If the image capturing stop aperture is smaller than f1, the control circuit at step S1313 widens the focus detecting stop aperture to f1, and appropriately adjusts the focus detecting charge accumulation time period. However, an appropriate exposure amount for the focus detection may be obtained by shortening the focus detecting charge accumulation time period with the widening of the stop aperture to f1.

If the correction coefficient RatioC is 1 at step S1306, there is no need to change the exposure amount for the phase difference detection method focus detection. However, the control circuit at step S1314 determines whether or not the image capturing stop aperture is larger than f1. If the image capturing stop aperture is larger than f1, the control circuit does not correct the exposure amount. On the other hand, if the image capturing stop aperture is smaller than f1, the control circuit at step S1315 widens the focus detecting stop aperture to f1, and corrects an increase in exposure amount caused by the wider stop aperture by shortening the focus detecting charge accumulation time period.

The above processing enables acquisition of an exposure amount appropriate for performing the phase difference detection method focus detection at the active focus detection area which is the selected focus detection area. Then, at step S1316, the control circuit causes the focus detection pixel to perform the photoelectric conversion (charge accumulation). Thereafter, at step S1317, the control circuit performs the phase difference detection method focus detection by using the focus detection signals read out from the focus detection pixels. Then, at step S1318, the control circuit ends the sequence.

As described above, in this embodiment, the focus detecting stop aperture is decided based on the level of the signals obtained by the photoelectric conversion performed by the image pickup pixels at the active focus detection area selected as a focus detection area where the phase difference detection method focus detection and the contrast detection method focus detection are performed among the plural focus detection areas. This enables setting of an appropriate stop aperture for the phase difference detection method focus detection according to luminance of the active focus detection area, in other words, of a focus detection area including a main object (subject) which is an image capturing target.

[Embodiment 4]

In the image pickup apparatus of each of Embodiments 1 and 2, even in the continuous image capturing, the video signal generated by the signal processing circuit which processes the image pickup signals read out from the image pickup pixels in the image pickup element is displayed on the monitor 107. Thus, the continuous image capturing can be performed while a user observes an object on the monitor 107.

In the image pickup apparatus of Embodiment 1 and a partial case in the image pickup apparatus of Embodiment 2, even when the focus detection signals are read out from the focus detection pixels in the focus detection between the image capturing operations, the image pickup signals can be read out from the image pickup pixels. Thus, processing these image pickup signals to display on the monitor 107 the processed image pickup signals as a frame image subsequent to the captured image (frame image) obtained by the image capturing operations makes it possible to display a video image having smoother motion.

In this case, correcting a level difference between the image pickup signals caused by a difference in exposure condition between the image capturing operation and the focus detection by the signal processing circuit enables realization of video image displaying with reduced brightness variation.

According to the above-described embodiments, in the continuous image capturing mode and the low-speed continuous image capturing mode, even when the necessary light amount cannot be provided to the focus detection pixels with the image capturing stop aperture, the stop aperture is widened (increased) to the focus detecting stop aperture. Thus, in the focus detection, the necessary light amount can be provided to the focus detection pixels, and therefore the continuous image capturing can be performed with good focus detection.

Further, in the high-speed continuous image capturing mode, when the image capturing stop aperture is larger than the focus detecting stop aperture, the phase difference detection method focus detection is performed using the signals obtained by the photoelectric conversion performed by the focus detection pixels in the precedent image capturing operation. On the other hand, when the image capturing stop aperture is smaller than the focus detecting stop aperture, the contrast detection method focus detection is performed using the signals obtained by the photoelectric conversion performed by the image pickup pixels in the precedent image capturing operation. Thus, even when the time period between the image capturing operations in the continuous image capturing mode is short, the continuous image capturing can be performed with good focus detection.

Furthermore, the present invention is not limited to these embodiments and various variations and modifications may be made without departing from the scope of the present invention.

This application claims the benefit of Japanese Patent Application No. 2009-167679, filed on Jul. 16, 2009, which is hereby incorporated by reference herein in its entirety.

What is claimed is:

1. An image pickup apparatus comprising:
an image pickup element configured to include first pixels for photoelectrically converting an object image formed by a light flux from an image taking optical system and second pixels for photoelectrically converting optical images formed by light fluxes divided from the light flux from the image taking optical system; and a controller configured to perform (a) focus detection based on a phase difference of the optical images, the phase difference being detected by using signals obtained by photoelectric conversion performed by the second pixels, (b) control of an aperture stop included in the image taking optical system, and (c) an image capturing operation for generating a captured image by using signals obtained by photoelectric conversion performed by the first pixels, wherein the controller is configured to increase, when an aperture size of the aperture stop set for the image capturing operation is smaller than a focus detecting aperture size corresponding to a light amount necessary for the focus detection in a case of performing the focus detection between the image capturing operations in continuous image capturing, the aperture size to the focus detecting aperture size in the focus detection.

2. An image pickup apparatus according to claim 1, wherein the controller is configured to perform, when the aperture size set for the image capturing operation is larger than the focus detecting aperture size in the case of performing the focus detection between the image capturing operations in the continuous image capturing, the focus detection with keeping the aperture size equal to that set for the image capturing operation.

3. An image pickup apparatus according to claim 1, wherein plural focus detection areas are formed in the image pickup element, and an active focus detection area where the focus detection is performed is selectable from the plural focus detection areas, and wherein the controller is configured to decide the focus detecting aperture size based on a level of the signals obtained by the photoelectric conversion performed by the first pixels included in the active focus detection area.

4. An image pickup apparatus comprising:

an image pickup element configured to include first pixels for photoelectrically converting an object image formed by a light flux from an image taking optical system and second pixels for photoelectrically converting optical images formed by light fluxes divided from the light flux from the image taking optical system; and a controller configured to perform (a) phase difference detection method focus detection based on a phase difference of the optical images, the phase difference being detected by using signals obtained by photoelectric conversion performed by the second pixels, (b) contrast detection method focus detection based on contrast information detected by using signals obtained by photoelectric conversion performed by the first pixels, (c) control of an aperture stop included in the image taking optical system, and (d) an image capturing operation for generating a captured image by using the signals obtained by the photoelectric conversion performed by the first pixels, wherein the image pickup apparatus has a first continuous image capturing mode in which the phase difference detection method focus detection is performed between the image capturing operations, and a second continuous image capturing mode in which a time period between the image capturing operations is shorter than that in the first continuous image capturing mode, wherein the controller is configured to increase in the first continuous image capturing mode, when an aperture size of the aperture stop set for the image capturing operation is smaller than a focus detecting aperture size corresponding to a light amount necessary for the phase difference detection method focus detection, the aperture size to the focus detecting aperture size in the phase difference detection method focus detection, wherein the controller is configured to perform in the second continuous image capturing mode, when the aperture size set for the image capturing operation is larger than the focus detecting aperture size, the phase difference detection method focus detection for a subsequent image capturing operation by using the signals obtained by the photoelectric conversion performed by the second pixels in a precedent image capturing operation, and wherein the controller is configured to perform in the second continuous image capturing mode, when the aperture size set for the image capturing operation is smaller than the focus detecting aperture size, the contrast detection method focus detection for the subsequent image capturing operation by using the signals obtained by the photoelectric conversion performed by the first pixels in the precedent image capturing operation.

5. An image pickup apparatus according to claim 4, wherein the controller is configured to perform in the first continuous image capturing mode, when the aperture size set for the image capturing operation is larger than the focus detecting aperture size, the phase difference detection method focus detection with keeping the aperture size equal to that set for the image capturing operation.

6. An image pickup apparatus according to claim 4, wherein plural focus detection areas are formed in the image pickup element, and an active focus detection area where the phase difference detection method focus detection and the contrast detection method focus detection are performed is selectable from the plural focus detection areas, and wherein the controller is configured to decide the focus detecting aperture size based on a level of the signals obtained by the photoelectric conversion performed by the first pixels included in the active focus detection area.

7. A method for controlling an image pickup apparatus including an image pickup element configured to include first pixels for photoelectrically converting an object image formed by a light flux from an image taking optical system and second pixels for photoelectrically converting optical images formed by light fluxes divided from the light flux from the image taking optical system, the method comprising the steps of:

performing focus detection based on a phase difference of the optical images, the phase difference being detected by using signals obtained by photoelectric conversion performed by the second pixels;

performing control of an aperture stop included in the image taking optical system;

performing an image capturing operation for generating a captured image by using signals obtained by photoelectric conversion performed by the first pixels; and increasing, when an aperture size of the aperture stop set for the image capturing operation is smaller than a focus detecting aperture size corresponding to a light amount necessary for the focus detection in a case of performing the focus detection between the image capturing operations in continuous image capturing, the aperture size to the focus detecting aperture size in the focus detection.

8. A method for controlling an image pickup apparatus including an image pickup element configured to include first pixels for photoelectrically converting an object image formed by a light flux from an image taking optical system and second pixels for photoelectrically converting optical images formed by light fluxes divided from the light flux from the image taking optical system, the method comprising the steps of:

performing phase difference detection method focus detection based on a phase difference of the optical images, the phase difference being detected by using signals obtained by photoelectric conversion performed by the second pixels;

performing contrast detection method focus detection based on contrast information detected by using signals obtained by photoelectric conversion performed by the first pixels;

performing control of an aperture stop included in the image taking optical system; and performing an image capturing operation for generating a captured image by using the signals obtained by the photoelectric conversion performed by the first pixels, wherein the image pickup apparatus has a first continuous image capturing mode in which the phase difference detection method focus detection is performed between the image capturing operations, and a second continuous image capturing mode in which a time period between the image capturing operations is shorter than that in the first continuous image capturing mode, and wherein the method further comprising the steps of:

increasing in the first continuous image capturing mode, when an aperture size of the aperture stop set for the image capturing operation is smaller than a focus detecting aperture size corresponding to a light amount necessary for the phase difference detection method focus detection, the aperture size to the focus detecting aperture size in the phase difference detection method focus detection, performing in the second continuous image capturing mode, when the aperture size set for the image capturing operation is larger than the focus detecting aperture size, the phase difference detection method focus detection for a subsequent image capturing operation by using the signals obtained by the photoelectric conversion performed by the second pixels in a precedent image capturing operation, and performing in the second continuous image capturing mode, when the aperture size set for the image capturing operation is smaller than the focus detecting aperture size, the contrast detection method focus detection for the subsequent image capturing operation by using the signals obtained by the photoelectric conversion performed by the first pixels in the precedent image capturing operation.

* * * * *